United States Patent [19]

Kellogg

[11] 3,760,119

[45] Sept. 18, 1973

[54] CROSSPOINT SWITCH ALLOTTER RELEASE DETECTION CIRCUIT

[75] Inventor: Frank Kellogg, Genoa, Ill.

[73] Assignee: GTE Automatic Electric Laboratories Incorporated, Northlake, Ill.

[22] Filed: Aug. 31, 1972

[21] Appl. No.: 285,279

[52] U.S. Cl. .......................... 179/18 GE
[51] Int. Cl. .......................... H04q 3/495
[58] Field of Search .................. 179/18 GF, 18 GE, 179/27 G, 175.23, 175.2 C, 175.2 R, 18 E

[56] References Cited

UNITED STATES PATENTS

| | | | |
|---|---|---|---|
| 3,588,367 | 6/1971 | White | 179/18 GF |
| 3,546,390 | 12/1970 | Hackenberg et al. | 179/18 GE |

*Primary Examiner*—Kathleen H. Claffy
*Assistant Examiner*—Kenneth D. Baugh
*Attorney*—K. Mullerheim et al.

[57] ABSTRACT

A crosspoint allotter release detection circuit for disabling the crosspoint connection if the allotter is falsely held operated following establishment of the connection, including, first relay means for detecting the completion of crosspoint selection, second relay means, with a slow-to-operate relay coil, coupled to a holding ground for the crosspoint connection, and third relay means interconnecting the first and second relay means, the third relay means responsive to a falsely held operated allotter and operative on the slow-to-operate relay coil to break the crosspoint connection, thereby avoiding undesired erroneous multiple selections in the allotter highway's associated switches.

7 Claims, 1 Drawing Figure

PATENTED SEP 18 1973 3,760,119
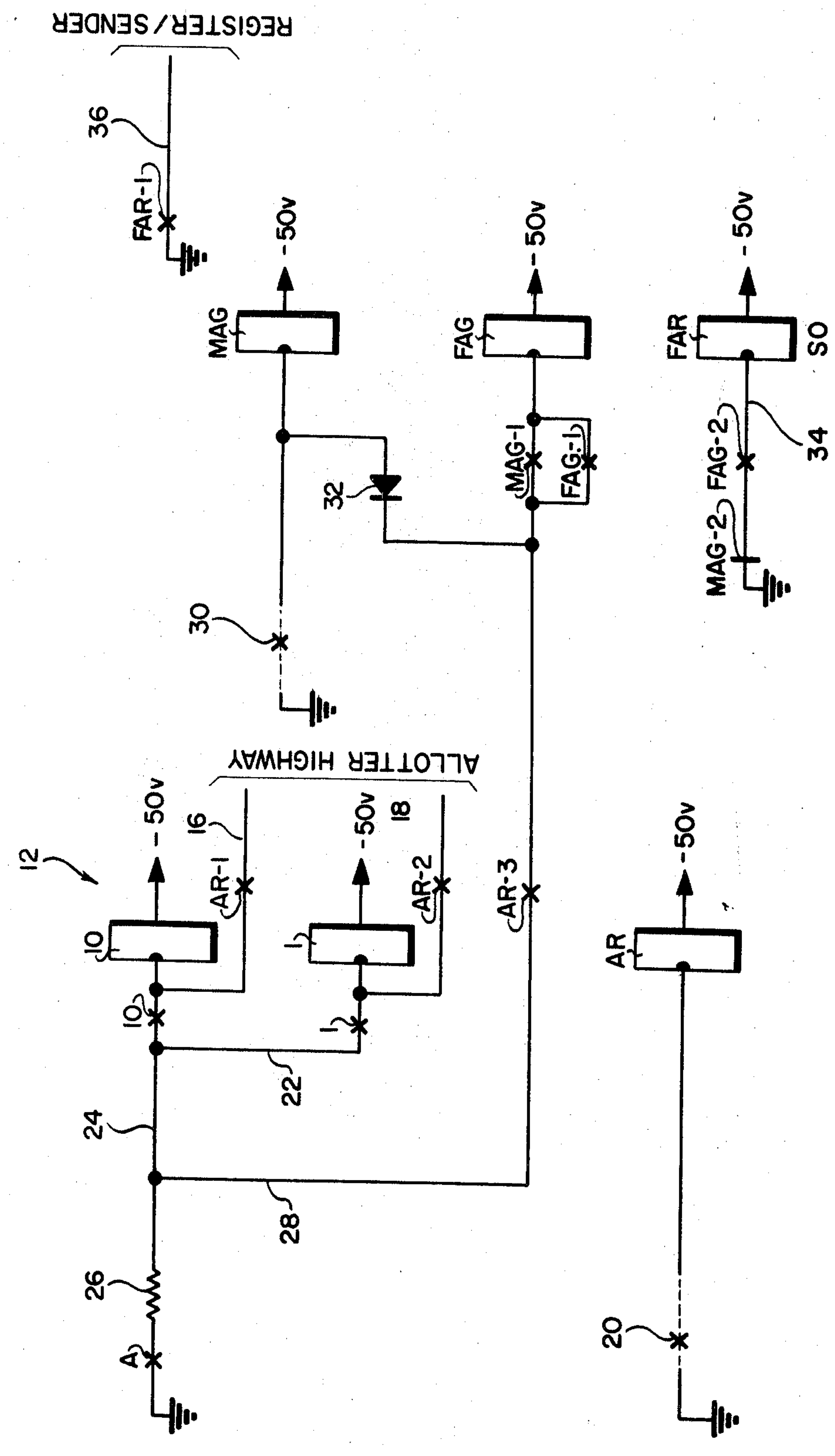

CROSSPOINT SWITCH ALLOTTER RELEASE DETECTION CIRCUIT

This invention relates to crosspoint switches and in particular to crosspoint switch allotter release detection apparatus.

Crosspoint matrix switches of the type with which this invention is concerned are commonly used in automatic telephone systems and reference may be made for example to U.S. Pat. Nos. 2,187,784; 2,573,889; 2,672,521; 3,363,064; 3,500,001; 3,585,318; 3,586,784; 3,588,367 and the various patents referenced therein. Such matrix switches are used as finders, connectors, terminating junctors, register/senders, etc. Each crosspoint switch employs "tens" and "units" actuators with corresponding conductor groups (particularly see U.S. Pat. No. 2,573,889) for selecting a particular crosspoint in the matrix of conductor groups. Allotter actuator apparatus associated with each crosspoint includes a plurality of selection conductors termed the "allotter highway" connected to the tens and units actuators. The allotter thus operates the tens and units actuators corresponding to the desired crosspoint for establishing the crosspoint connection.

Under normal operations the allotter is dropped or disabled once the crosspoint is established. However, when a crosspoint switch's allotter apparatus is falsely held operated, the switch's locking ground through the previously selected tens and units coils is erroneously placed on the allotter highway thereby causing multiple selections in the allotter highway's associated switches. The allotter apparatus can be falsely held operated when the allotter relay fails to release or is slow in releasing. In addition, occasionally the relay operated contact lifting mechanism hangs up or becomes sticky on release.

SUMMARY OF THE INVENTION

A crosspoint allotter release detection circuit is provided for detecting the establishment of a crosspoint connection and aborting the call and disabling the crosspoint connection if the associated allotter is falsely held operated following establishment of the initial crosspoint connection. In particular, first relay means are provided for detecting the completion of crosspoint selection which normally coincides with releasing of the allotter relay. Second relay means are coupled to the holding ground for the crosspoint connections, the second relay means including a slow to operate relay. Third relay means intercouple the first and second relay means for responding to a falsely held operated allotter relay condition and to accordingly signal said second relay means to remove the holding ground from the crosspoint and thereby abort the call.

BRIEF DESCRIPTION OF THE DRAWING

The drawing illustrates a crosspoint switch allotter release detection circuit in accordance with the principles of the present invention.

DETAILED DESCRIPTION

Referring now to the drawing, there is illustrated the tens actuator (10) and a units actuator (1) of a crosspoint switch assembly 12. It is to be realized that the crosspoint switch assembly 12 normally includes a number of tens and units actuators, however, for convenience only two of the actuators are shown in the drawing. The tens actuator has associated therewith a related normally open contact 10 and the units actuator correspondingly has associated therewith a normally open contact 1. Associated with the crosspoint switch there is provided allotter apparatus including a plurality of conductors comprising what is normally termed the allotter highway 14. Two of the allotter highway conductors 16 and 18 are illustrated in the drawing, conductor 16 being coupled to one end of the tens actuator and conductor 18 being coupled to one end of the units actuator. Within each of the conductors 16 and 18 there is located a normally open allotter relay contact for coupling a grounding connection to the tens and units actuator. As illustrated, the other end of the tens and units actuators is connected to the negative battery supply in the system, which in a telephone system can be, for instance, negative 50 volts.

The allotter apparatus includes allotter relay AR with negative battery on one side and connected through normally open contact 20 to ground. During the initial calling sequence, an originating marker operating through the register junctor can for instance close contact 20 and place the operating ground on the allotter relay AR. For convenience the invention will be described with reference to a telephone system, although it is useful with other switching systems.

In the normal telephone connection, a lead 22 and lead 24 connect the tens and units actuators through a small resistor 26 and normally open contact A to a locking ground. The magnitude of resistor 26 depends on the size of the crosspoint switch, that is, the number of tens and units actuators in the switch itself. Contact A is normally associated with a holding relay operated through an originating marker, or terminating marker.

A lead 28 connected to lead 24 extends through several normally open contacts to relay FAG. The other end of this relay is connected to negative battery. Within lead 28 there is provided normally open contact AR–3 which is operated from the allotter relay. In addition, there is provided two normally open contacts in parallel, MAG–1 contact and FAG–1 contact. A relay MAG is connected between negative battery and normally open contact 30. Contact 30 can for example be operated through the originating marker so as to connect ground to relay MAG. Relay MAG normally performs additional functions in a telephone system not connected with the present invention, so that for purposes of incorporating the present invention, there is included a diode 32 which is reverse biased to the negative battery through relay MAG. This prevents undesired operation of relay MAG through paths other than the applied ground through contact 30.

A relay FAR is provided with one end through to negative battery and another end connected through lead 34 and normally open contact FAG–2 and normally closed contact MAG-2 to an operating ground. As indicated in the drawing, relay FAR is a slow-to-operate relay with an operating time of, for instance, 50–100 miliseconds. An associated normally open relay contact FAR–1 interconnects an operating ground through lead 36 to the register/sender. When relay FAR operates to close contact FAR–1, the operating ground on relay 36 applied to the register/sender signals the abortion of a call so as to drop holding relay A and remove the locking ground from the tens and units actuators to disable the crosspoint connection.

In operation, assuming that a telephone goes off hook, the associated line circuit will request an originating marker. The originating marker will identify the calling lines by tens and units and will operate the first available register junctor in the group of 100 lines associated with the calling line. The register junctor will close contact A and the originating marker, through the register junctor, will close contacts 20 and 30. The closure of contact 20 oprates the allotter relay AR so as to close all of the illustrated allotter contacts AR–1 through AR–3.

As an illustration, closure of contact AR–1 in the allotter highway 14 places a ground through lead 16 to the tens unit actuator so as to operate the actuator and close the contact 10. In addition, an operating ground is applied through conductor 18 of the allotter highway 14 to operate the unit actuator and close contact 1. Closure of the tens and units contacts places a locking ground through contact A and lead 24 to the tens and units actuators. This completes the selection of the crosspoint connection in crosspoint switch 12. At the same time that the allotter relay was operated, the MAG relay is operated through contact 30 which thereby closes the MAG–1 contact and operates the FAG relay.

Under normal operating circumstances, on completion of the selection of the crosspoint connection in switch 12, the operating grounds through contacts 20 and 30 are removed from the AR and MAG relays. The MAG relay in releasing applies ground through contact MAG–2 to the slow-to-operate FAR relay. Normally the allotter relay releases thereby removing the ground from the FAG relay to release before the FAR relay can operate.

However, if the allotter relay fails to release or is slow-in-releasing, the locking ground supplied through contact A and lead 28 prevents the FAG relay from releasing. Since the MAG relay has dropped and the FAG relay is still help operated, after a short period of time the slow-to-operate FAR relay operates. In operating, the FAR relay places a ground through contact FAR–1 to lead 36 which is connected into the register/sender.

This ground instructs the register/sender to abort the call, thereby releasing the switch train. Releasing of the switch train removes the locking ground to contact A so as to disable the tens and units actuators and break the crosspoint connection in switch 12. Removal of the locking ground from lead 28 drops the FAG relay which in turn drops the FAR relay. The present invention thus prevents a faulty switch from undesirably creating multiple selections in the telephone system.

While the above description has been given in connection with a telephone system, it is understood that this is merely for purposes of illustrating an embodiment of the invention and is not meant to limit the application of the present invention in any way. For example, the allotter release detection circuit of the present invention can be utilized in other switching systems.

The foregoing detailed description has been given for clearness of understanding only, and no unnecessary limitations should be understood therefrom as modifications will be obvious to those skilled in the art.

What is claimed is:

1. In crosspoint switch apparatus including an allotter actuator for establishing a crosspoint connection, and holding means for applying a locking ground to maintain said crosspoint connection, the improvement comprising:

first relay means for detecting the signalled release of said allotter actuator following establishment of said crosspoint connection;

second relay means coupled to said holding means for selectively disabling said holding means and breaking said crosspoint connection; and third relay means intercoupling said first and second relay means for responding to a falsely operated allotter actuator and enabling said said second relay means to break said crosspoint connection.

2. The improvement of claim 1, wherein said first, second and third relay means includes respectively, a first relay coil (MAG), a second relay coil (FAR) and a third relay coil (FAG).

3. The improvement of claim 2, including:

a normally open relay contact (MAG–1) serially connected with said third relay coil, said contact (MAG–1) operatively associated with said first relay coil; and a normally open relay contact (AR–3) serially interconnected between said third relay coil, and said locking ground, said contact (AR–3) operatively associated with said allotter actuator;

said allotter actuator and said first relay coil (MAG) operable during establishment of said crosspoint connection for closing said contacts (AR–3) and (MAG–1) and coupling said locking ground to operate said third relay coil (FAG).

4. The improvement of claim 3, including:

a normally open relay contact (FAG–1) operatively associated with said third relay coil; and means for connecting said normally open relay contacts (MAG–1) and (FAG–1) in parallel.

5. The improvement of claim 4, including:

a normally closed relay contact (MAG–2) serially connected with said second relay coil, said contact (MAG–2) operatively associated with said first relay coil;

a normally open relay contact (FAG–2) in series connection with said contact (MAG–2) and said second relay coil (FAR), said contact operatively associated with said third relay coil (FAG); and means for preventing operation of said second relay coil (FAR) for a predetermined time following closure of said contacts (MAG–2) and (FAG–2), and enabling operation of said second relay coil after said predetermined time has elapsed.

6. The improvement of claim 5, wherein said second relay coil (FAR) comprises a slow-to-operate relay corresponding to said predetermined time.

7. The improvement of claim 3, including means responsive to the continued closure of said contact (AR–3) for selectively operating said second relay coil (FAR) to break said crosspoint connection.

* * * * *